(12) United States Patent
Crevenat et al.

(10) Patent No.: US 10,056,217 B2
(45) Date of Patent: Aug. 21, 2018

(54) DEVICE FOR PROTECTION AGAINST TRANSITORY OVERVOLTAGES

(71) Applicant: CITEL, Sevres (FR)

(72) Inventors: Vincent Crevenat, Sevres (FR); Jacques Joubert, Sevres (FR)

(73) Assignee: CITEL, Sevres (FR)

( * ) Notice: Subject to any disclaimer, the term of this patent is extended or adjusted under 35 U.S.C. 154(b) by 0 days.

(21) Appl. No.: 15/592,761

(22) Filed: May 11, 2017

(65) Prior Publication Data

US 2017/0330719 A1    Nov. 16, 2017

(30) Foreign Application Priority Data

May 12, 2016    (FR) .................................. 16 54243

(51) Int. Cl.
*H01C 7/10*    (2006.01)
*H01H 85/02*    (2006.01)
(Continued)

(52) U.S. Cl.
CPC .......... *H01H 85/0241* (2013.01); *H01C 1/14* (2013.01); *H01C 7/12* (2013.01); *H01H 85/055* (2013.01); *H01H 85/203* (2013.01)

(58) Field of Classification Search
CPC ............. H01H 85/0241; H01H 85/055; H01H 85/203; H01C 1/14; H01C 7/12
(Continued)

(56) References Cited

U.S. PATENT DOCUMENTS 7,656,640 B2 * 2/2010 Domejean ............... H01H 83/10 361/111
RE42,319 E * 5/2011 Martenson ............ H01C 7/126 218/117
(Continued)

FOREIGN PATENT DOCUMENTS

EP    0895332 A1    2/1999
EP    1447831 A1    8/2004

OTHER PUBLICATIONS

Preliminary Search Report (Institut National de la Propriété Industrielle, France) with regard to FR 1654243 dated Mar. 30, 2017.
(Continued)

*Primary Examiner* — Kyung Lee
(74) *Attorney, Agent, or Firm* — Notaro, Michalos & Zaccaria P.C.

(57) ABSTRACT

The invention concerns a device for protection against transitory overvoltages, comprising: a varistor; a discharge tube; a thermofusible soldering securing a first electrode of the discharge tube and a first electrode of the varistor, the thermofusible soldering being a conductor of electricity and being able to melt beyond a temperature threshold when the varistor or the discharge tube heats up; the second electrode of the varistor being designed to be connected to a first electrical line and the second electrode of the discharge tube being designed to be connected to a second electrical line; a restoring element exerting a restoring force tending to move the first electrode of the varistor away from the first electrode of the discharge tube in order to allow a separation between the first electrode of the varistor and the first electrode of the discharge tube during a melting of the thermofusible soldering.

11 Claims, 8 Drawing Sheets

(51) Int. Cl.
  *H01C 1/14*   (2006.01)
  *H01C 7/12*   (2006.01)
  *H01H 85/055*   (2006.01)
  *H01H 85/20*   (2006.01)

(58) Field of Classification Search
  USPC .......................................................... 338/21
  See application file for complete search history.

(56) References Cited

U.S. PATENT DOCUMENTS

| | | | | |
|---|---|---|---|---|
| 8,378,778 | B2* | 2/2013 | Duval | H01C 7/126 338/13 |
| 9,007,163 | B2* | 4/2015 | Duval | H01C 7/126 337/1 |
| 2002/0024792 | A1 | 2/2002 | Cantagrel | |
| 2008/0130180 | A1* | 6/2008 | de Palma | H01C 7/112 361/56 |

OTHER PUBLICATIONS

English Abstract of EP0895332 retrieved on Espacenet on May 9, 2017.
English Abstract of EP1447831 retrieved on Espacenet on May 9, 2017.

* cited by examiner

DEVICE FOR PROTECTION AGAINST TRANSITORY OVERVOLTAGES

CROSS-REFERENCE

The present application claims priority from French Patent Application No. 1654243 filed on May 12, 2016, the entire content of which is incorporated herein by reference.

TECHNICAL FIELD

The invention relates to the field of components for protection against overvoltages for electrical equipment.

TECHNOLOGICAL BACKGROUND

For the protection of electrical equipment, it is customary to use, between the two lines of AC mains, a metal oxide varistor, especially zinc oxide, mounted in series on the one hand with a thermofusible disconnection element, and on the other hand with a gas discharge tube.

Such a device functions theoretically as follows: the gas discharge tube sustains practically the entire AC voltage of the mains. In fact, the stray capacitance of the discharge tube is of the order of a picofarad, whereas the stray capacitance of the varistor is several nanofarads to several dozen nanofarads. When an overvoltage occurs, it causes a priming of the gas discharge tube, which can only be extinguished if the so-called follow current passing through it subsequently becomes low enough. It is the resistance of the varistor which provides for the limiting of the follow current and enables the extinguishing of the gas discharge tube.

When a device for protection against overvoltages has been operated a certain number of times or in continuous manner due to a prolonged overvoltage, its components reach the end of their life. For a gas discharge tube, the end of life corresponds to a short circuiting. On the other hand, for a varistor the end of life may involve an explosion for pulsed phenomena or a strong decrease in its internal resistance (tending to a short circuit), which often may result in its catching fire. As a safety measure, the gas discharge tube may be designed so that its ability to let pass the energy pulses related to the overvoltages is less than that of the varistor. In this way, it is the gas discharge tube which is the first to reach its end of life and become short circuited.

The mains voltage is then entirely placed on the varistor, which heats up, resulting in the melting of the thermofusible element and thermal disconnection, i.e., the disabling of the protection device.

However, it is hard to make certain of the reliability of the disconnection produced by the melting of the thermofusible element.

SUMMARY OF THE INVENTION

One basic idea of the invention is to provide a device for protection against transitory overvoltages ensuring a total disconnection at the end of life of the components, by a better sensitivity to the disconnection.

According to one embodiment, the invention provides a device for protection against transitory overvoltages, comprising:
  a varistor comprising a varistor body and two electrodes disposed on either side of the varistor body, the varistor body being able to rise in temperature when the voltage imposed between the two electrodes crosses a first threshold,
  a discharge tube comprising a tube body and two tube electrodes disposed on either side of the tube body, the tube body being able to generate an electric arc between the two electrodes and heat up when the voltage imposed between the two electrodes crosses a second threshold,
  a thermofusible soldering securing a first electrode of the discharge tube and a first electrode of the varistor, the thermofusible soldering being a conductor of electricity and being able to melt beyond a temperature threshold when the varistor or the discharge tube heats up,
  the second electrode of the varistor being designed to be connected to a first electrical line and the second electrode of the discharge tube being designed to be connected to a second electrical line, and
  a restoring element exerting a restoring force tending to move the first electrode of the varistor away from the first electrode of the discharge tube in order to allow a separation between the first electrode of the varistor and the first electrode of the discharge tube during a melting of the thermofusible soldering.

Thanks to these characteristics, electrical equipment connected to the first electrical line or to the second electrical line is protected against transitory overvoltages occurring between the first electrical line and the second electrical line. Thanks to these characteristics, the device for protection against transitory overvoltages is protected against any fire caused by the varistor when it reaches its end of life.

The device is particularly advantageous in that it has been made very sensitive to the thermal disconnection due to the fact that the thermofusible soldering is arranged between the varistor and the discharge tube, each of which can bring about its melting.

Many pieces of equipment could be protected by a device for protection according to the invention. For example, electronic, telephone, computer, photovoltaic, lighting with light-emitting diodes, wind power, radio communication and other equipment.

According to embodiments, such a device comprises one or more of the following characteristics:

In one embodiment, the discharge tube is movable.

In one embodiment, the restoring element is able to move the discharge tube upon melting of the thermofusible soldering.

In one embodiment, the protection device comprises a blade attached to the discharge tube, the blade being able to move upon melting of the thermofusible soldering from a position of connection in which the first electrodes of the discharge tube and the varistor are attached by the thermofusible soldering to a position of disconnection in which the first electrodes of the discharge tube and the varistor are placed at a distance from one another.

In one embodiment, the blade is able to move the discharge tube.

In one embodiment, the blade is attached to the discharge tube via the second electrode and is a conductor of electricity, so as to ensure an electrical connection between the second electrode of the discharge tube and the second electrical line.

The blade is able to move from the position of connection of the blade to the position of disconnection of the blade in any given direction. In one embodiment, the blade is able to move from the position of connection of the blade to the position of disconnection of the blade in a direction substantially perpendicular to a plane of the first electrode of the discharge tube or the varistor. In one embodiment, the blade is able to move from the position of connection of the blade to the position of disconnection of the blade in a direction substantially parallel to a plane of the first electrode of the discharge tube or the varistor.

In one embodiment, the blade is an elastic blade which is prestressed in its position of connection so as to exert an intrinsic restoring force toward its position of disconnection.

In one embodiment, the restoring element is a spring acting on the blade, and configured to return the blade to its position of disconnection.

In one embodiment, the spring is a helical spring stressed between the blade and a surface parallel to the first electrode of the varistor.

In one embodiment, the device further comprises an insulator able to be inserted between the first electrode of the discharge tube and the first electrode of the varistor when the thermofusible soldering melts. Thanks to these characteristics, any electric arc between the varistor and the discharge tube upon melting of the thermofusible soldering is prevented.

Such an insulator has the function in particular of electric arc quenching.

In one embodiment, the insulator comprises an insulating shelf mounted so that it can move from a non-inserted position to an inserted position in which the insulating shelf is disposed between the first electrodes of the varistor and the discharge tube under the effect of a restoring force exerted by a spring.

There are other ways of bringing about the insertion of an insulator between the varistor and the discharge tube. For example, in another embodiment, the insulator comprises an insulating shelf which is mounted so that it can move under the force of gravity from a non-inserted position to an inserted position in which the insulating shelf is disposed between the first electrodes of the varistor and the discharge tube.

In one embodiment, the insulating shelf is mounted so it is able to move in rotation between the non-inserted position and the inserted position.

In one embodiment, the insulating shelf is made of plastic.

In one embodiment, the restoring element is a spring acting on the insulator and forcing the insulator against the discharge tube so that, upon melting of the thermofusible soldering, the insulator moves the discharge tube and separates the first electrode of the varistor from the first electrode of the discharge tube.

In one embodiment, the blade is a flexible blade which is prestressed in its position of disconnection so as to exert a restoring force to its position of connection.

There are many suitable restoring elements to move at least one of the varistor and the discharge tube upon melting of the thermofusible soldering.

In one embodiment, the device comprises one or more restoring elements selected from the list including: the elastic blade, the spring exerting the restoring force on the insulating shelf, the spring acting on the blade.

In one embodiment, the device furthermore comprises a housing in which are arranged the varistor, the thermofusible soldering and the discharge tube and two connection terminals emerging from the housing, being respectively connected to the second electrode of the discharge tube and the second electrode of the varistor and designed respectively to be connected to the first electrical line and to the second electrical line. Thanks to these characteristics, the device is compact.

According to one embodiment, one of the connection terminals is formed integrally with the elastic blade.

Solderings or weldings produced between any given pair of elements of the component selected from among the connection terminals, the electrodes of the discharge tube, or of varistors are solderings or weldings which are conductors of electricity. In one embodiment, the solderings or weldings are made of metal whose melting point is greater than the melting point of the thermofusible soldering.

In one embodiment, the thermofusible soldering comprises an alloy of which tin is the principal constituent. The alloy likewise comprises one or more elements selected from the list including: Pb, Cu, Zn, Ag, Bi, In, Sb so as to select a melting point of the thermofusible soldering which is lower than the melting point of tin. For example, the thermofusible soldering comprises one of the alloys selected from the list including: SnPbAg, SnCuAg, and SnBi.

According to one embodiment, the body of the varistor is made of metal oxide.

According to one embodiment, the discharge tube is a gas discharge tube (GDT), also known as a "Gas-filled Spark Gap (GSG)".

According to one embodiment, the varistor is selected from the group including a varistor of any possible dimensional shape, such as circular, tubular, rectangular, square, or various other shapes.

According to one embodiment, the varistor is a zinc oxide varistor (ZnO).

BRIEF DESCRIPTION OF THE FIGURES

The invention shall be better comprehended, and other of its purposes, details, characteristics and advantages will emerge more clearly in the course of the following description of several particular embodiments of the invention, given solely as an illustration and not limiting, making reference to the appended drawings.

In these drawings.

DETAILED DESCRIPTION OF THE INVENTION

A device 1 designed to protect electrical equipment against overvoltages shall now be presented with reference to the figures.

Figure 11:
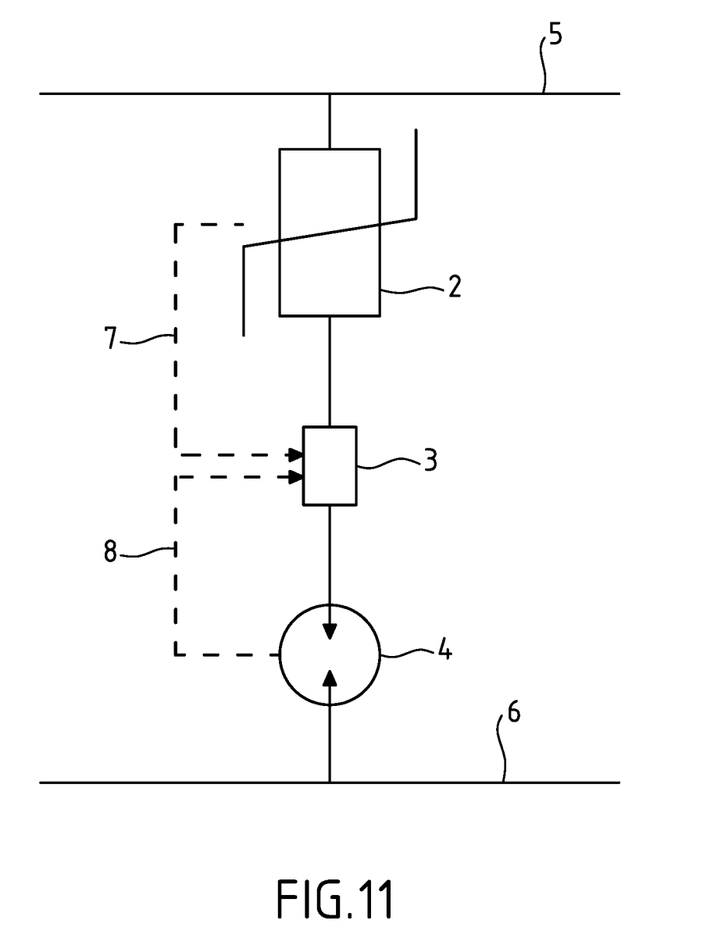
FIG. 11 is an electrical diagram of the device in FIG. 1.

The equivalent electrical diagram of a protection device 1 according to the invention shall be described in relation to FIG. 11. The device 1 comprises a discharge tube 4, a varistor 2 and a thermofusible soldering 3 mounted in series between two electrical lines 5 and 6 of the circuit or electrical equipment being protected. The electrical lines 5 and 6 may be any conductor serving to bring electric power under a low or medium voltage to electrical equipment. The thermofusible soldering 3 is connected to a first electrode of the discharge tube 4 and to a first electrode of the varistor 2. A first thermal bridge 7 allows dissipation of the heat emitted by the varistor 2 toward the thermofusible soldering 3. A second thermal bridge 8 allows dissipation of the heat emitted by the discharge tube 4 toward the thermofusible soldering 3. Thus, the thermofusible soldering is sensitive to the heating of the varistor 2 and the discharge tube 4. A second electrode of the discharge tube 4 is connected to the electrical line 6 needing to be protected. A second electrode of the varistor 2 is connected to the electrical line 5 needing to be protected.

The structure of a protection device 1 according to the invention shall now be described in reference to FIGS. 1 to 10.

Figure 2:
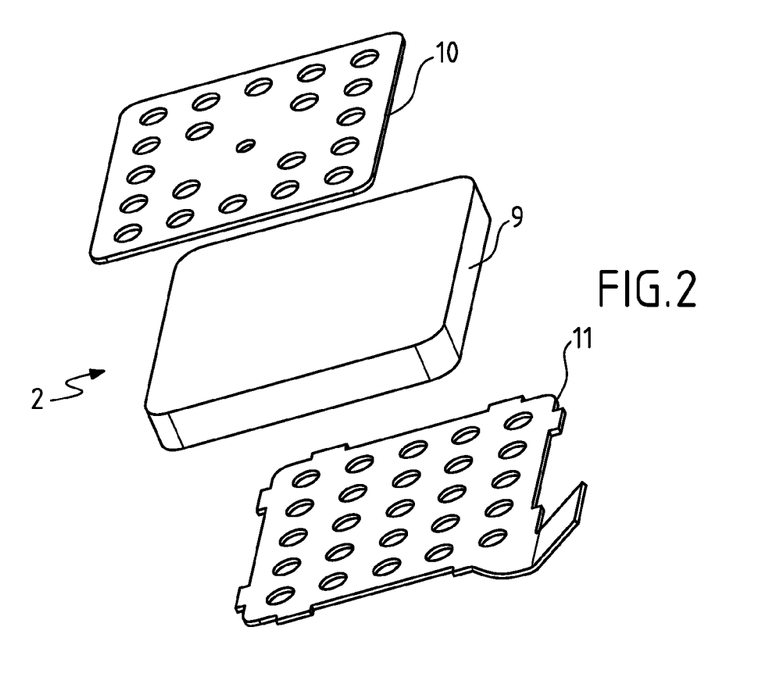
FIG. 2 is an exploded perspective view of a varistor suitable for implementing the invention.

Such a protection device 1 comprises a varistor 2, such as a varistor of rectangular shape, comprising a rectangular wafer of zinc oxide 9 and two electrodes 10 and 11, likewise being rectangular and placed on either side of the wafer of zinc oxide 9, as represented in FIG. 2.

Figure 5:
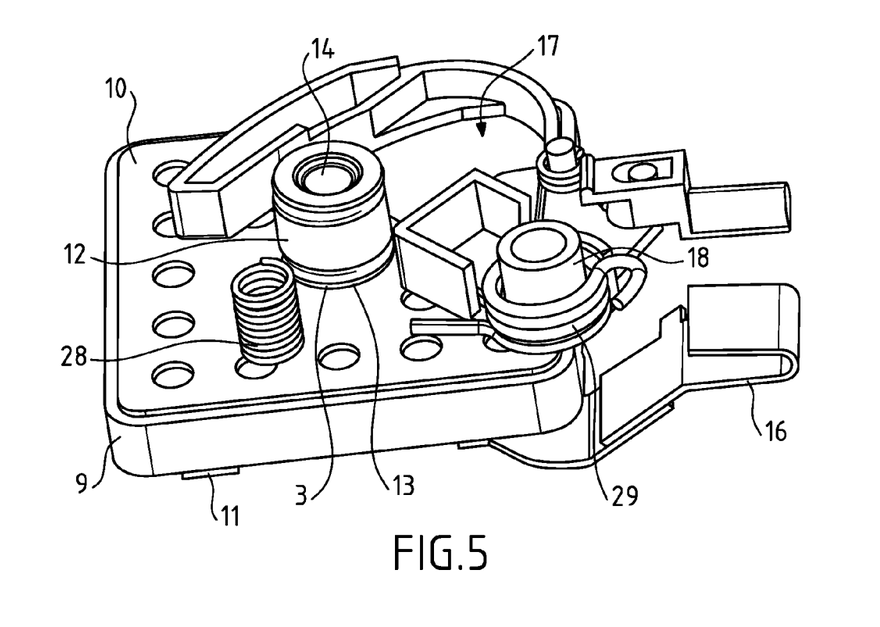
FIG. 5 is a perspective view of the device in FIG. 1, in which certain elements are not shown.
Figure 6:
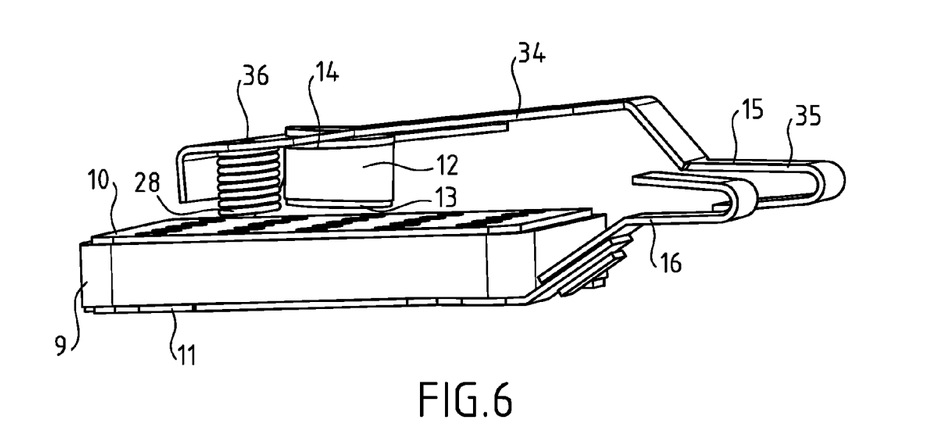
FIG. 6 is a perspective view of the varistor and the discharge tube in a disconnected state.

The device 1 likewise comprises a gas discharge tube 4, shown in particular in FIGS. 5 and 6, comprising a cylindrical body 12 and two electrodes 13 and 14 on either side of this cylindrical body 12. Preferably, the gas discharge tube 4 is of small size. Preferably, the gas discharge tube 4 is a discharge tube of bipolar type. For example, the gas discharge tube 4 is selected from among gas discharge tubes of the CITEL brand, with reference BA, BB, BH, BG, BF.

In a connected state of the device 1, shown for example in FIG. 5, the first electrode 13 of the discharge tube 4 and the first electrode 10 of the varistor 2 are disposed one on another, and attached by means of the electrically conductive thermofusible soldering 3. Thus, the electrical connection is assured between the two first electrodes 10 and 13.

Figure 1:
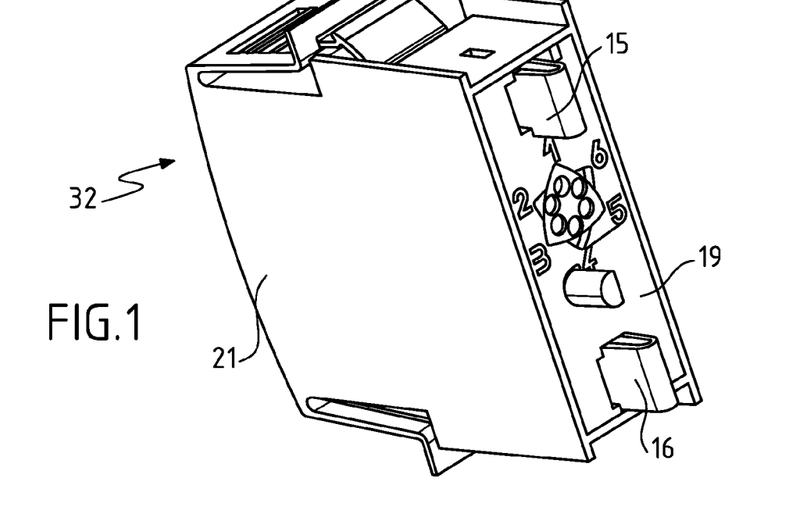
FIG. 1 is a perspective view of part of a device for protection against overvoltages according to the invention.

The device 1 is arranged in a housing 32 represented in FIG. 1. The device 1 also comprises two connection terminals 15 and 16 respectively connected electrically to the second electrodes 11 and 14 of the discharge tube 4 and the varistor 2. In the embodiment represented in reference to FIGS. 1 to 10, especially in FIG. 6, the connection terminal 15 comprises an elastic blade 34, such as one made of copper alloy. The elastic blade 34 is secured to the second electrode 14 of the discharge tube 4, for example by a soldering. Furthermore, the connection terminal 15 comprises a first end 35 which is designed to connect the device 1 to an electrical line. The elastic blade 34 has a second end 36 which extends beyond the attachment of the elastic blade 34 to the second electrode 14 of the discharge tube 4. In the embodiment shown, the elastic blade 34 is formed integrally with the end 35 of the connection terminal designed to provide the connection of the device to one of the lines. In other words, the connection terminal 15 is a monobloc and comprises the elastic blade 34 having the first end 35 and the second end 36.

However, it is perfectly possible for the connection terminal 15 to be formed of two distinct elements, namely, an elastic blade 34 and an element 35 designed to provide the connection of the device to one of the lines, welded to each other.

In the area of its end 34 opposite the end 35 designed to connect the device 1 to an electrical line, the elastic blade 34 is secured by an attachment element 33 conductive of electricity to the second electrode 14 of the discharge tube 4. The elastic blade 34 is thus constrained by means of the attachment element 33 when the thermofusible soldering 3 secures the two first electrodes of the discharge tube and the varistor 13 and 10 to each other. The elastic blade 34 is moreover able to perform a movement perpendicular to a plane of the first electrode 10 of the varistor 2, in the direction separating the first electrodes of the varistor 10 and the discharge tube 13, under the effect of a restoring force when the thermofusible soldering 3 no longer secures the two first electrodes of the discharge tube and the varistor 13 and 10 to each other.

In the embodiment shown, the attachment element 33 is comprised of a deep drawn and perforated portion and a weld made in the deep drawn portion and passing through the perforation to emerge at the second electrode of the discharge tube 14, as shown in FIGS. 6 to 10.

The housing element 19 has two orifices 22 and 23 in which are arranged respectively the end 35 of the connection terminal 15 and one end of the connection terminal 16. Thus, the two ends of the connection terminals 15 and 16 emerge from the housing 32. The two ends of the connection terminals 15 and 16 are designed to be connected respectively to the first electrical line 6 and to the second electrical line 5. The housing comprises a bush 21 in which is lodged a housing element 19 represented in FIG. 4. The housing element 19 in particular has a wall with a lower surface 25 and an upper surface 24, the wall being open at a zone 26. The wall of the housing element 19 has a principal plane oriented in parallel with a plane of the first electrode 10 of the varistor 2. The varistor 2 is arranged below this plane, the first electrode 10 of the varistor being in contact with the lower surface of the wall 25. The zone 26 provides access for the attachment of the discharge tube 4 to the first electrode of the varistor 10.

The device 1 likewise comprises a restoring element able to separate the first electrodes of the varistor 2 and the discharge tube 4 upon melting of the thermofusible soldering 3. Such a restoring element in the present case is a helical spring 28 which cooperates with the end 36 of the elastic blade 34. The helical spring 28 is prestressed against one wall 30 of a seat 31 of the housing element 19. The seat 31 is of cylindrical shape with an axis perpendicular to the wall 24 in order to guide the helical spring 28. The end 36 of the elastic blade 34 furthermore has a second deep drawn portion forming a guide pin. Said guide pin is inserted into the helical spring 28 and thus holds it in position.

Figure 3:
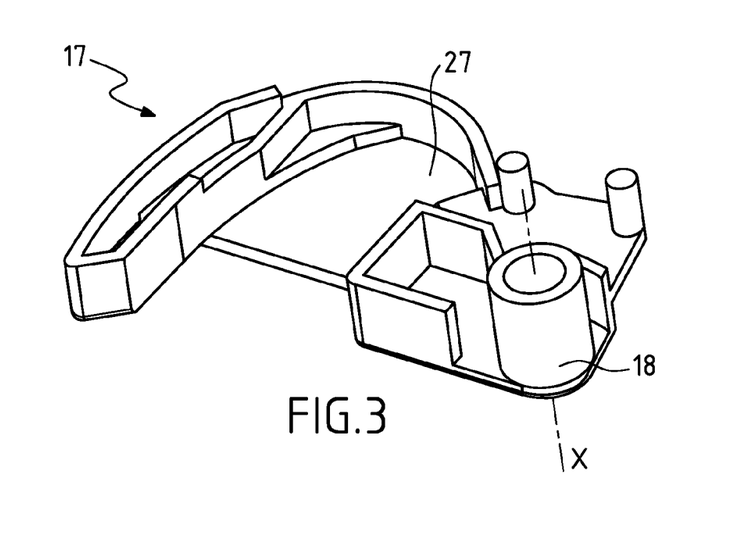
FIG. 3 is a perspective view of the insulator of the device in FIG. 1.
Figure 4:
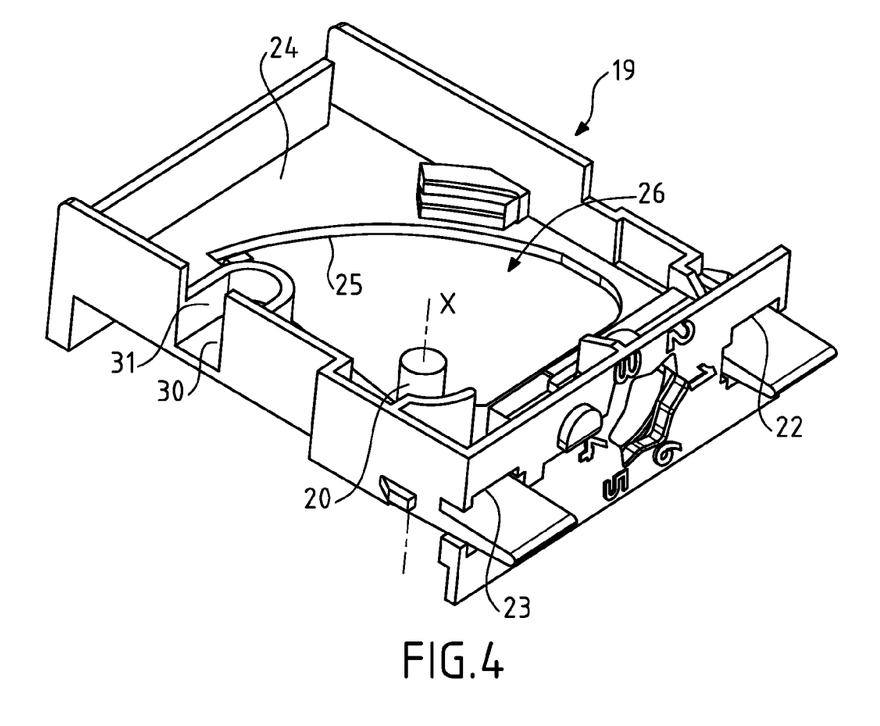
FIG. 4 is a perspective view of an element of the housing of FIG. 1.

The device 1 furthermore comprises a plastic insulator 17 represented in FIG. 3. The insulator 17 is able to prevent the occurrence of an electric arc between two electrodes when it is placed between them. The insulator 17 is mounted able to rotate in the device 1, as shall be described in further detail. The insulator 17 has a substantially planar insulating blade 27 and a cylindrical tube 18 with X axis perpendicular to the plane of the insulating blade 27. The cylindrical tube 18 is threaded onto the rod 20 of the housing element. The cylindrical tube 18 is thus guided in rotation on the rod 20 such that the insulator can pivot about the X axis. A torsion spring 29 constrains the insulator 17 in rotation about the X axis, as shown in FIG. 5. The torsion spring 29 is threaded onto the rod 18 and comprises one end bearing against the housing element 19 and one end bearing against a wall of the insulator 17.

Now that the structure of the device 1 has been described, two states of this device 1 shall be examined in further detail.

Figure 7:
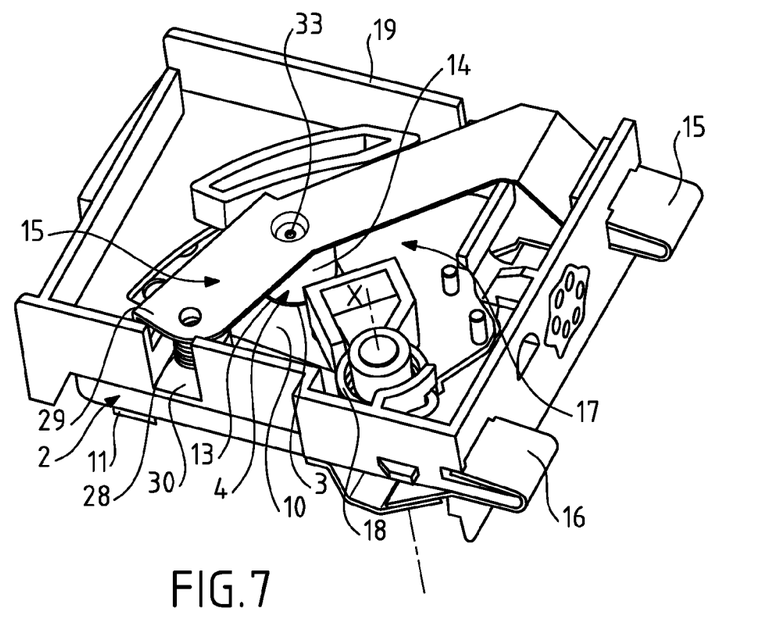
FIG. 7 is a perspective view of the varistor and the discharge tube of FIG. 6 in a connected state, as well as the insulator of FIG. 3, disposed in the housing element of FIG. 4.
Figure 8:
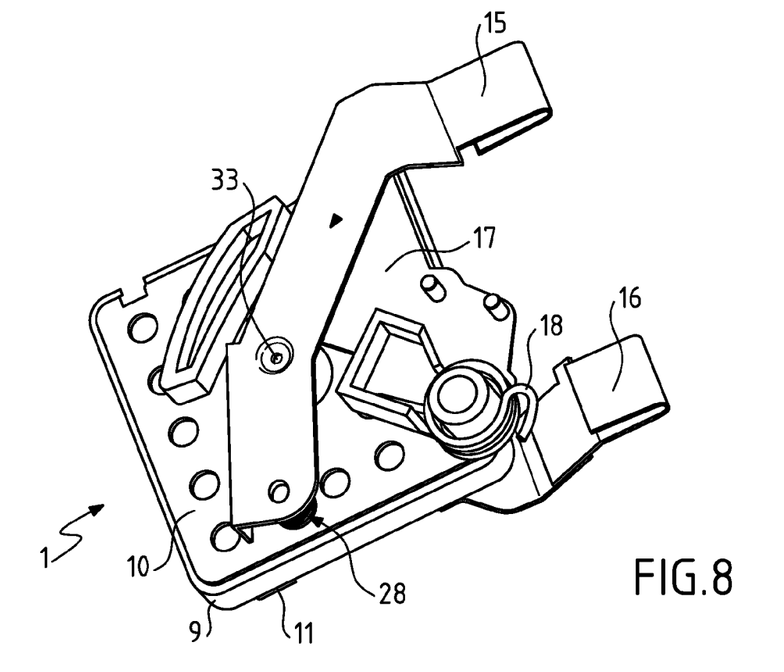
FIG. 8 is a view per FIG. 7, in which the housing element is not shown.

A first state, which will be known as the "connected state", shall be described in reference to FIGS. 7 and 8. A second state, which will be known as the "disconnected state", shall be described in reference to FIGS. 9 and 10.

In its connected state, the device allows the electrical connection between the first electrode 13 of the discharge tube 4 and the first electrode 10 of the varistor 2 by means of the thermofusible soldering 3. As explained above, the elastic blade 34 and the helical spring 28 are elastically prestressed. The insulator 17 is maintained elastically abutting against the body of the discharge tube 12 by the spring 29.

The functioning of such a device 1 during a transitory overvoltage, such as one caused by melting, between the lines 5 and 6 electrically connected to the connection terminals 15 and 16, shall be described. The overvoltage primes the discharge tube 4. In fact, the discharge tube 4 changes from a state of very high impedance to a state near a short circuit upon application of a voltage higher than a voltage threshold between the electrical line 5 and the electrical line 6.

Moreover, this overvoltage induces a current which passes through the varistor 2 and the discharge tube 4. The current passing through the varistor 2 and the discharge tube 4 then induces a progressive heating of the varistor 2 and the discharge tube 4 and, by conduction, a progressive heating of the thermofusible soldering 3 by means of the thermal bridges 7 and 8. The thermofusible soldering 3 changes to a liquid state and no longer secures the varistor 2 and the discharge tube 4. The insulation between the electrical lines 5 and 6 is effective.

Figure 9:
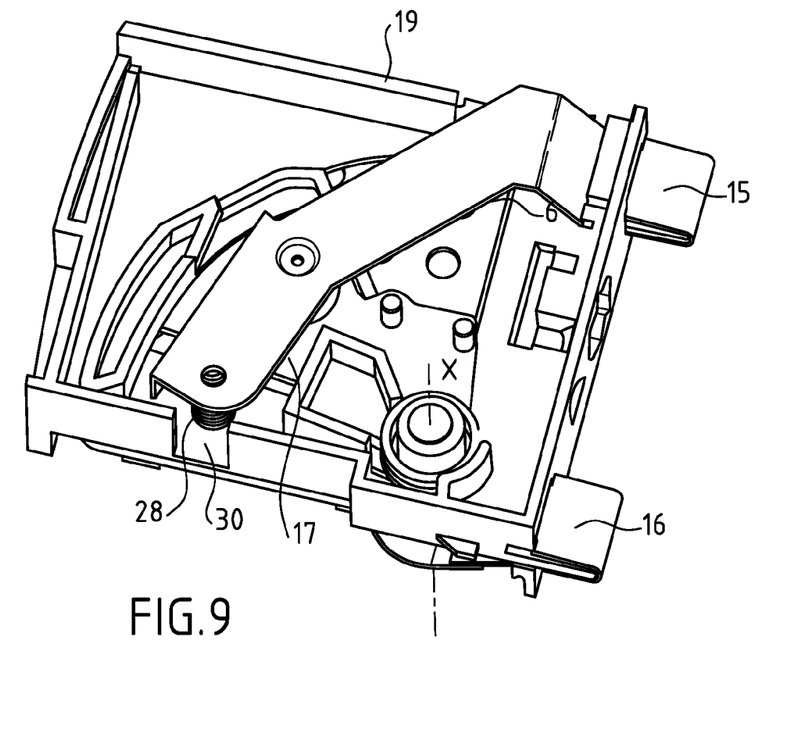
FIG. 9 is a view per FIG. 7, in which the varistor and the discharge tube are in a disconnected state.
Figure 10:
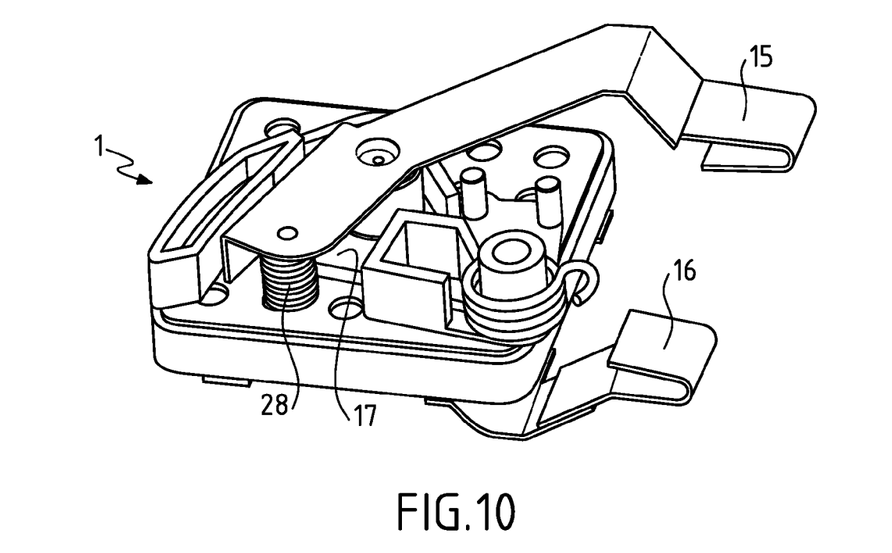
FIG. 10 is a view per FIG. 9, in which the varistor and the discharge tube are in a disconnected state and the insulator is in an inserted position.

The disconnected state of the device 1 shall now be described in further detail with reference to FIGS. 9 and 10.

In its disconnected state, the device no longer enables the electrical connection between the first electrode 13 of the discharge tube 4 and the first electrode 10 of the varistor 2, since the thermofusible soldering 3 has melted.

In this disconnected state, the function of attachment of the first electrodes 10 and 13 of the discharge tube 4 and the varistor 2 is no longer fulfilled by the thermofusible soldering 3.

Thus, the connection terminal 15 and the helical spring 28 return elastically to a free state in which they are no longer prestressed. Once this has been done, the connection terminal 15 pulls the discharge tube 4 by means of the attachment element 33 in a direction perpendicular to the plane of the first electrode 10 of the varistor 2 and in the direction of separation of the first electrodes 10 and 13 of the discharge tube 4 and the varistor 2.

The insulating blade 27 is no longer abutting against the body of the discharge tube 12 and it is inserted between the first electrodes 10 and 13 of the discharge tube 4 and the varistor 2. The insulating blade 27 thus insulates the first electrodes 10 and 13 of the discharge tube 4 and the varistor 2 against each other. The insulating blade 27 thus prevents the occurrence of an electric arc between the first electrodes of the discharge tube and the varistor.

The fabrication of such a component 1 is easy and it can be industrialized and performed in series.

Thus, the device 1 is able to protect the lines 5 and 6 against fires by disconnecting them totally upon temperature elevation beyond a temperature threshold.

Figure 12:
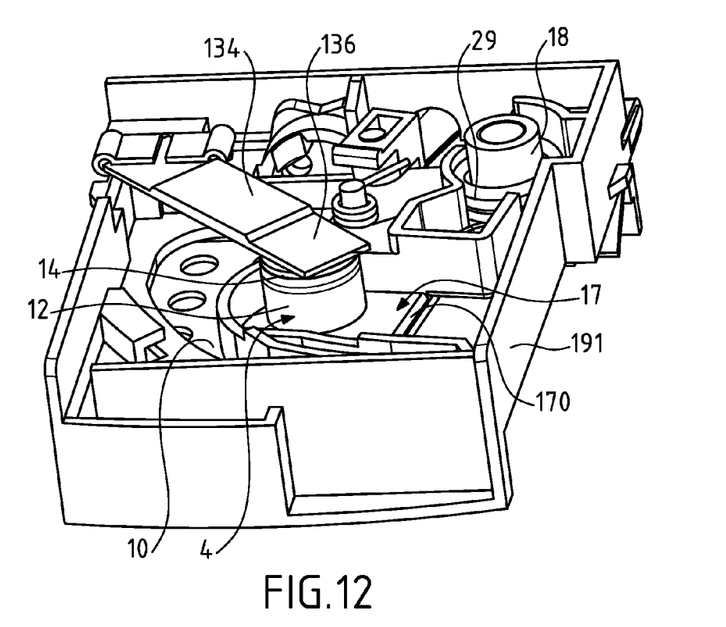
FIG. 12 is a perspective view of part of a device for protection in a disconnected state according to a second embodiment of the invention.
Figure 13:
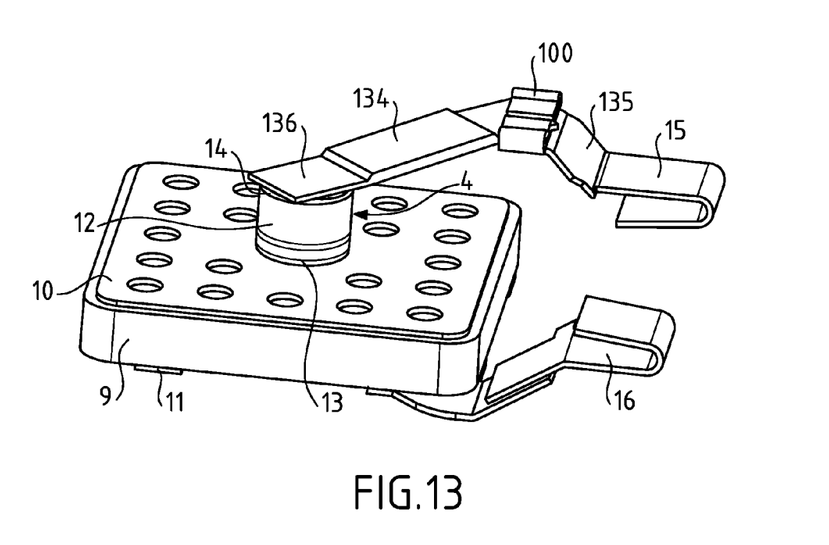
FIG. 13 is a perspective view of one varistor and connection terminals of the device for protection of FIG. 12 in a disconnected state.

Another embodiment of the invention is represented with reference to FIGS. 12 and 13. Similar or identical elements to the embodiment represented with reference to FIGS. 1 to 10 are identified by the same reference numbers.

In this embodiment, as represented in FIG. 13, the connection terminal 15 is formed by two distinct parts: a flexible blade 134 and a terminal 135 designed to provide the connection of the device to one of the lines.

The flexible blade 134 and the terminal 135 are attached to each other by a holding element 100 formed integrally with the terminal 135. The holding element 100 shown is formed by a rectangular metal plate bent at a first end of the flexible blade in order to prevent a relative movement between the first end of the flexible blade 134 and the terminal 135. Alternatively, the holding element 100 can be a weld produced between the flexible blade 134 and the terminal 135.

A second end 136 of the flexible blade 134 is secured by a soldering or welding to the second electrode of the discharge tube 14.

The flexible blade 134 is made of copper, for example.

FIG. 12 shows the protection device in a housing 191 nearly identical to the housing 19.

One notable difference of this embodiment as compared to that represented in FIGS. 1 to 10 is that the restoring element able to separate the first electrodes of the varistor 2 and the discharge tube 4, upon melting of the thermofusible welding 3, is not a helical spring, but instead is the same here as the torsion spring 29 of the insulator 17.

The flexible blade 134 performs the function of electrical connection of the connection terminal 15 with the second electrode of the discharge tube 14.

The insulator 17 is thus able to perform, upon melting of the thermofusible soldering 3, first the function of an electrical insulator between the first electrode 10 of the varistor 2 and the first electrode 13 of the discharge tube 4 and secondly, thanks to the torsion spring 29, the function of restoration able to separate the first electrodes of the varistor 2 and the discharge tube 4.

Thus, unlike the embodiment shown in FIGS. 1 to 10, the elastic blade 134 does not have an end cooperating with a helical spring exerting a force on the elastic blade 134 tending to separate said end of the first electrode 10 of the varistor 13.

The protection device represented in FIGS. 12 and 13 functions in particular as described below.

The insulator 17 has a portion 170 of decreasing thickness whose function is that of a ramp. In the connected state of the device, the portion 170 of the insulator 17 is held elastically abutting against the body of the discharge tube 12 or against the first electrode of the discharge tube 13 by the force of the torsion spring 29.

The restoring force of the torsion spring 29 is manifested as a force exerted by the portion 170 of the insulator 17 on the body of the discharge tube 12 or against the first electrode of the discharge tube 13.

Upon melting of the thermofusible soldering 3, the fixation function of the first electrodes 10 and 13 of the discharge tube 4 and the varistor 2 is no longer performed by the thermofusible soldering 3.

Thus, the portion 170 of the insulator is no longer held by the body of the discharge tube 12 or against the first electrode of the discharge tube 13 and it forces the discharge tube 4 to move vertically upward toward the top of the device.

The portion 170 of the insulator 17 is then inserted between the first electrode 10 of the varistor 2 and the first electrode 13 of the discharge tube 4 so as to act as an insulator, or an arc quencher.

Figure 14:
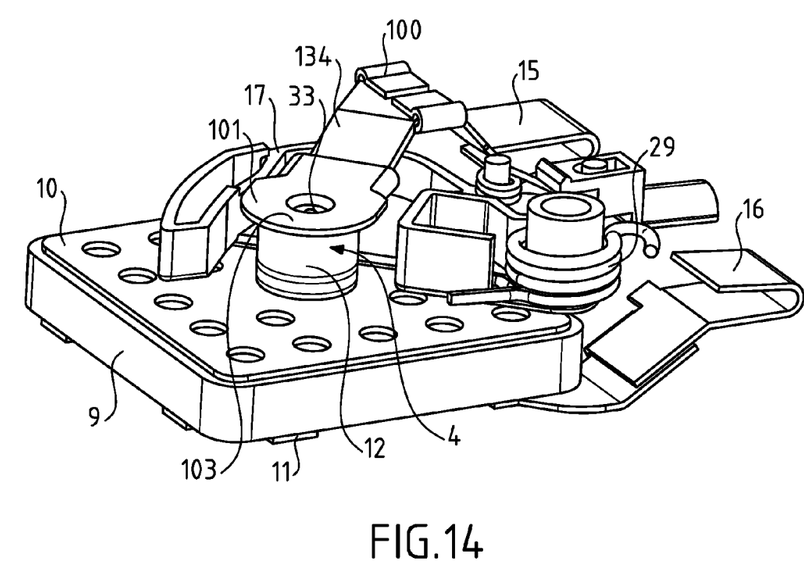
FIG. 14 is a perspective view of part of a device for protection in a connected state according to a third embodiment of the invention.
Figure 15:
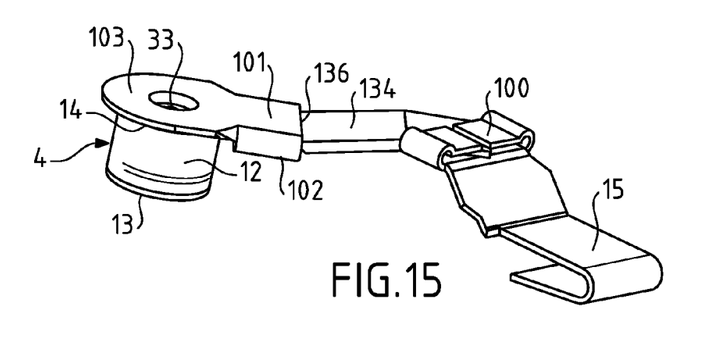
FIG. 15 is a perspective view of a discharge tube and one connection terminal of the device for protection of FIG. 14.

Another embodiment of the invention is shown with reference to FIGS. 14 and 15. Similar or identical elements to the embodiment represented with reference to FIGS. 12 and 13 are identified by the same reference numbers.

The second end 136 of the flexible blade 134 is secured by means of a holding element 101 to the second electrode of the discharge tube 14. This holding element 101 is a metal plate conductive of electricity, also known as a lug, distinct from the flexible blade 134 and secured to the latter by a portion 102 of the holding element 101.

The portion 102 of the holding element 101 is a rectangular metal plate bent at the second end 136 of the flexible blade 134 in order to prevent a relative movement between the second end 136 of the flexible blade 134 and the holding element 101.

The holding element 101 likewise has a second portion 103 of circular shape comprising an attachment element 33 to secure the second electrode of the discharge tube 14 and ensure the electrical connection between the flexible blade 134 and the second electrode of the discharge tube 14. This attachment element 33 is formed by a deep drawn and perforated portion and a weld produced in the deep drawn portion and passing through the perforation to emerge at the second electrode of the discharge tube 14.

The embodiment of the device shown in FIGS. 14 and 15 functions in the same way as that represented in FIGS. 12 and 13 as regards the changing of the device from a connected state to a disconnected state.

Although the invention has been described in connection with several particular embodiments, it is obviously in no way limited by this and it encompasses all equivalent techniques of the means described, as well as their combinations, if these fall within the scope of the invention.

The use of the verbs "comprise", "contain" or "include" and their conjugated forms does not exclude the presence of other elements or other steps than those mentioned in a claim. The use of the indefinite article "a" or "an" for an element or a step does not exclude the presence of a plurality of such elements or steps, unless otherwise mentioned.

In the claims, any reference symbol shown in brackets shall not be interpreted as a limitation of the claim.

The invention claimed is:

1. A device for protection against transitory overvoltages, comprising:
    a varistor comprising a varistor body and a first and a second electrodes disposed on either side of the varistor body, the varistor body being able to rise in temperature when the voltage imposed between the electrodes crosses a first threshold,
    a discharge tube comprising a tube body and a first and a second tube electrodes disposed on either side of the tube body, the tube body being able to generate an electric arc between the first and second tube electrodes and heat up when the voltage imposed between the first and second tube electrodes crosses a second threshold,
    a thermofusible soldering securing the first tube electrode of the discharge tube and the first electrode of the varistor, the thermofusible soldering being a conductor of electricity and being able to melt beyond a temperature threshold when the varistor heats up and when the discharge tube heats up,
    the second electrode of the varistor being designed to be connected to a first electrical line and the second tube electrode of the discharge tube being designed to be connected to a second electrical line, and
    a restoring element exerting a restoring force tending to move the first electrode of the varistor away from the first electrode of the discharge tube in order to allow a separation between the first electrode of the varistor and the first electrode of the discharge tube during a melting of the thermofusible soldering.

2. The device of claim 1, further comprising a blade attached to the discharge tube, the blade being able to move upon melting of the thermofusible soldering from a position of connection in which the first tube electrode of the discharge tube and the first electrode of the varistor are attached by the thermofusible soldering to a position of disconnection in which the first tube electrode of the discharge tube and the first electrode of the varistor are placed at a distance from one another.

3. The device of claim 2, wherein the blade is attached to the discharge tube via the second tube electrode and is a conductor of electricity, so as to ensure an electrical connection between the second tube electrode of the discharge tube and the second electrical line.

4. The device of claim 2, wherein the blade is able to move from the position of connection of the blade to the position of disconnection of the blade in a direction substantially perpendicular to a plane of the first tube electrode of the discharge tube or the varistor.

5. The device of claim 2, wherein the blade is an elastic blade which is prestressed in its position of connection so as to exert a restoring force toward its position of disconnection.

6. The device of claim 2, wherein the restoring element is a spring acting on the blade, and configured to return the blade to its position of disconnection.

7. The device of claim 1, further comprising an insulator able to be inserted between the first tube electrode of the discharge tube and the first electrode of the varistor when the thermofusible soldering melts.

8. The device of claim 7, wherein the restoring element is a spring acting on the insulator and constraining the insulator so that, upon melting of the thermofusible soldering, the insulator moves the discharge tube and separates the first electrode of the varistor from the first tube electrode of the discharge tube.

9. The device of claim 7, wherein the insulator comprises an insulating shelf mounted so that it can move from a non-inserted position to an inserted position in which the insulating shelf is disposed between the first electrode of the varistor and the first tube electrode of the discharge tube under the effect of a restoring force exerted by a spring.

10. The device of claim 9, wherein the insulating shelf is movable in rotation between the non-inserted position and the inserted position.

11. The device of claim 1, further comprising a housing in which are arranged the varistor, the thermofusible soldering and the discharge tube and connection terminals emerging from the housing, being respectively connected to the second tube electrode of the discharge tube and the second electrode of the varistor and designed respectively to be connected to the first electrical line and to the second electrical line.

* * * * *